United States Patent
Choi et al.

(10) Patent No.: US 8,351,322 B2
(45) Date of Patent: Jan. 8, 2013

(54) TRANSMISSION OF PREAMBLE CODE FOR MOBILE WIMAX SYSTEMS

(75) Inventors: Yang-Seok Choi, Portland, OR (US); Ahmed Ibrahim, Cairo (EG); Jiacheng Wang, Chaoyan (CN)

(73) Assignee: Intel Corporation, Santa Clara, CA (US)

( * ) Notice: Subject to any disclaimer, the term of this patent is extended or adjusted under 35 U.S.C. 154(b) by 194 days.

(21) Appl. No.: 12/660,295

(22) Filed: Feb. 24, 2010

(65) Prior Publication Data

US 2010/0226322 A1     Sep. 9, 2010

Related U.S. Application Data

(60) Provisional application No. 61/156,882, filed on Mar. 3, 2009.

(51) Int. Cl.
    *H04J 11/00* (2006.01)
(52) U.S. Cl. .................................................. 370/208
(58) Field of Classification Search .............. 370/203, 370/208, 310, 328, 329, 464, 465, 470, 471, 370/472, 473, 476, 351, 389, 392, 431, 436, 370/478
    See application file for complete search history.

(56) References Cited

U.S. PATENT DOCUMENTS

| | | | | |
|---|---|---|---|---|
| 2002/0012334 A1* | 1/2002 | Strawczynski et al. | ....... | 370/337 |
| 2003/0210252 A1* | 11/2003 | Ludtke et al. | ............. | 345/629 |
| 2005/0226142 A1* | 10/2005 | Moorti et al. | ............. | 370/208 |
| 2005/0257117 A1 | 11/2005 | Chiang et al. | | |
| 2006/0159195 A1* | 7/2006 | Ionescu et al. | ............. | 375/267 |
| 2007/0272750 A1* | 11/2007 | Bjorklund | .................. | 235/435 |
| 2008/0000688 A1 | 1/2008 | McLoughlin et al. | | |
| 2008/0129537 A1 | 6/2008 | Osterloh et al. | | |
| 2009/0086832 A1 | 4/2009 | Tarokh | | |
| 2009/0161591 A1 | 6/2009 | Ahmadi | | |
| 2009/0168745 A1 | 7/2009 | Ahmadi | | |
| 2011/0128973 A1* | 6/2011 | Yonge et al. | ............. | 370/469 |

FOREIGN PATENT DOCUMENTS

| WO | 2010/101975 A2 | 9/2010 |
|---|---|---|
| WO | 2010/101975 A3 | 1/2011 |

OTHER PUBLICATIONS

International Search Report and Written Opinion on Patentability for PCT Patent Application No. PCT/US2010/026008, mailed on Oct. 19, 2010, 9 pages.
Office action received for European Paten Application No. 10749246.4, issued Sep. 14, 2011, 2 pages.
International Preliminary Report on Patentability issued in International Application No. PCT/US2010/026008, issued Sep. 15, 2011, 6 pages.
International Preliminary Report on Patentability received for PCT Patent Application No. PCT/US2010/026008, mailed on Sep. 15, 2011, 6 pages.
Office Action Received for the Korean Patent Application No. 2011-7020431, mailed on Aug. 29, 2012, 2 pages of English translation only.

* cited by examiner

*Primary Examiner* — Omar Ghowrwal

(74) *Attorney, Agent, or Firm* — Thorpe North & Western, LLP

(57) ABSTRACT

Embodiments of an apparatus and methods for transmission of timing and synchronization information for mobile WiMAX systems are generally described herein. Other embodiments may be described and claimed.

5 Claims, 7 Drawing Sheets

1 antenna 2 antennas 4 antennas 8 antennas

- Similarly, each four blocks of the 4 antenna case is transmitted using two antennas in the 8 antenna case using interleaved structure

US 8,351,322 B2

TRANSMISSION OF PREAMBLE CODE FOR MOBILE WIMAX SYSTEMS

REFERENCE TO RELATED INVENTIONS

This is a non-provisional application claiming the priority to provisional application Ser. No. 61/156,882 filed Mar. 3, 2009, and claims the priority of that filing date for all common subject matter.

FIELD OF THE INVENTION

The field of invention relates generally to the field of wireless communications, and in particular, to the coding of a channel for wireless communication.

BACKGROUND INFORMATION

Mobile Worldwide Interoperability for Microwave Access (WiMAX) is a broadband wireless technology for fixed and mobile broadband networks to enable broadband data services including data, streaming video, and voice. The robustness to severe interference and fast detection of the synchronization channel or synchronization preamble is crucial to fast cell selection, system timing and frequency acquisition cell coverage, and cell edge performance, as well as scan latency for the mobile stations. The preamble is used for timing and carrier synchronization and should have a sufficient number of distinct codes so that neighboring base stations have a unique preamble.

Mobile WiMAX systems may operate in accordance with standards such as the Institute for Electronic and Electrical Engineers (IEEE) 802.16e-2005 standard, "Air Interface for Fixed and Mobile Broadband Wireless Access Systems," (February, 2005) and, its evolution, the IEEE 802.16m standard, "Advanced Air Interface." In 802.16m, there are two advanced preambles: a primary advanced preamble (PA-Preamble) and a secondary advanced preamble (SA-preamble).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of systems and methods for transmission of preamble code for mobile WiMAX systems are described herein. In the following description, numerous specific details are set forth in order to provide a thorough understanding of embodiments of the present invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

WiMAX transmissions, particularly in 802.16m use a primary advanced preamble (PA-Preamble) and three secondary advanced preambles (SA-preamble) in a superframe. The advanced preambles are positioned as the first symbol of each frame within the superframe, wherein there are generally four frames per superframe. The PA-Preamble is designed for synchronization and is positioned as the first symbol of a second frame within the superframe to allow for timing offset and carrier frequency offset estimation and correction. Each SA-Preamble is designed to carry cell specific preamble code and is positioned as the first symbol of each of the remaining three frames. The SA-Preamble may also be used for fine tuning of timing and carrier synchronization.

The PA-preamble may have a defined sequence length and an allocation of subcarriers defined by a function described as:

$$PAPreambleCarrierSet = 2 \cdot k + 41$$

where: PAPreambleCarrierSet specifies all sub-carriers allocated to the PA-Preamble and k is a running index from 0 to 215.

The SA-preamble may be used to detect a SA-preamble index. Fine tuning of timing and frequency offset may be provided using the SA-preamble index. Path loss or received signal strength indicator information (RSSI) of strongest and/or interfering preambles may also be estimated.

Figure 1:
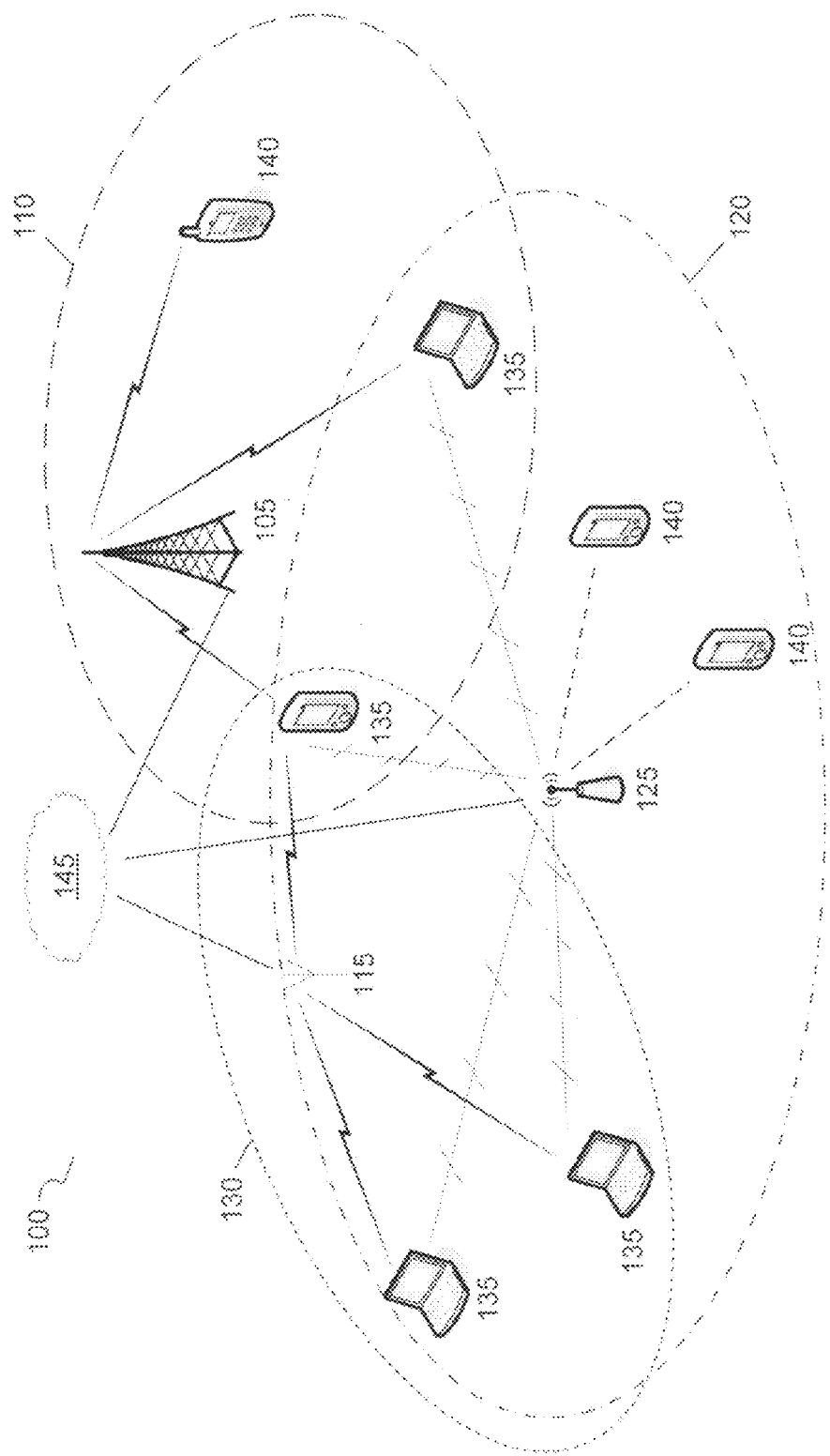
FIG. 1 illustrates wireless networks in accordance with some embodiments.

Now turning to the figures, FIG. 1 illustrates a wireless communication network 100 in accordance with some embodiments of the invention. The wireless communication network 100 includes a plurality of wired and/or wireless networks, generally shown as 110, 120, and 130. In particular, the wireless communication network 100 may comprise a wireless metropolitan area network (WMAN) 110, a wireless local area network (WLAN) 120, and a wireless personal area network (WPAN) 130. Although FIG. 1 depicts three wireless networks, the wireless communication system 100 may include additional or fewer wireless communication networks and one or more wired networks. For example, the wireless communication network 100 may include additional WPANs, WLANs, and/or WMANs. The methods and apparatus described herein are not limited in this regard.

The wireless communication network 100 also includes one or more platforms or stations (STA) including base stations, advanced base stations, subscriber stations, mobile stations, and/or advanced mobile STAs (AMS) generally shown as multi-radio AMSs 135 capable of heterogeneous wireless communication by accessing a plurality of wireless networks and/or wired networks, and single-radio AMSs 140 capable of accessing a single wireless network or a plurality of networks at any one time. For example, the AMSs 135 and 140 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts seven AMSs, the wireless communication network 100 may include more or less multi-radio AMSs 135 and/or single-radio AMSs 140.

The STAs may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, orthogonal frequency-division multiple access (OFDMA), multi-carrier modulation (MDM), and/or other suitable modulation techniques to communicate via wireless links.

In an embodiment, the STAs may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the AMSs 135 and/or 140 may communicate with devices associated with the WLAN 120 or an access point 125 via wireless links. The AP 125 may be operatively coupled to a router (not shown). Alternatively, the AP 125 and the router may be integrated into a single device (e.g., a wireless router).

The subscriber stations, mobile stations, or advanced mobile stations (e.g. multi-radio AMS 135 and a single-radio AMS 140) may use OFDM or OFDMA modulation to transmit large amounts of digital data by splitting a radio frequency signal into multiple small sub-signals, which in turn, are transmitted simultaneously at different frequencies. In particular, the stations may use OFDM or OFDMA modulation to implement the WMAN 110. The multi-radio AMS 135 and the single-radio AMS 140 may operate in accordance with the 802.16 family of standards developed by IEEE to provide for fixed, portable, and/or mobile broadband wireless access (BWA) networks (e.g., the IEEE std. 802.16, published 2004) to communicate with the base station 105, which may be an advanced base station (ABS), via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). In some embodiments, access point 125 and base station 105 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for WLANs, although the scope of the invention is not limited in this respect as they may also be suitable to transmit and/or receive communications in accordance with other techniques and standards. In some embodiments, access point 125 and base station 105 may communicate in accordance with the IEEE 802.16-2004, IEEE 802.16(e), and IEEE 802.16(m) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

The WMAN 110 and WLAN 120 may be operatively coupled to a common public or private network 145 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 145 via the AP 125 and/or WPAN STA 115 serving the WPAN 130. In another example, the WMAN 110 may be operatively coupled to the common public or private network 145 via the base station 105.

The wireless communication network 100 may include other suitable wireless communication networks. For example, the wireless communication network 100 may include a wireless wide area network (WWAN) (not shown). The stations may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards.

The WPAN may operate in a 60 GHz band to will achieve throughputs of about several Gbps. Currently a number of standardization groups (Institute for Electronic and Electrical Engineers (IEEE) 802.15.3c, IEEE 802,11ad, Wireless HD SIG, ECMA TG20) are working on the development of the specifications for such mmWave WPAN 130 and WLAN 120 networks. Although FIG. 1 depicts the WMAN 110, WLAN 120, and the WPAN 130 the wireless communication network 100 may include other combinations of WPANs, WLANs, WMANs, and/or WWANs. The methods and apparatus described herein are not limited in this regard.

The wireless communication network 100 may further include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
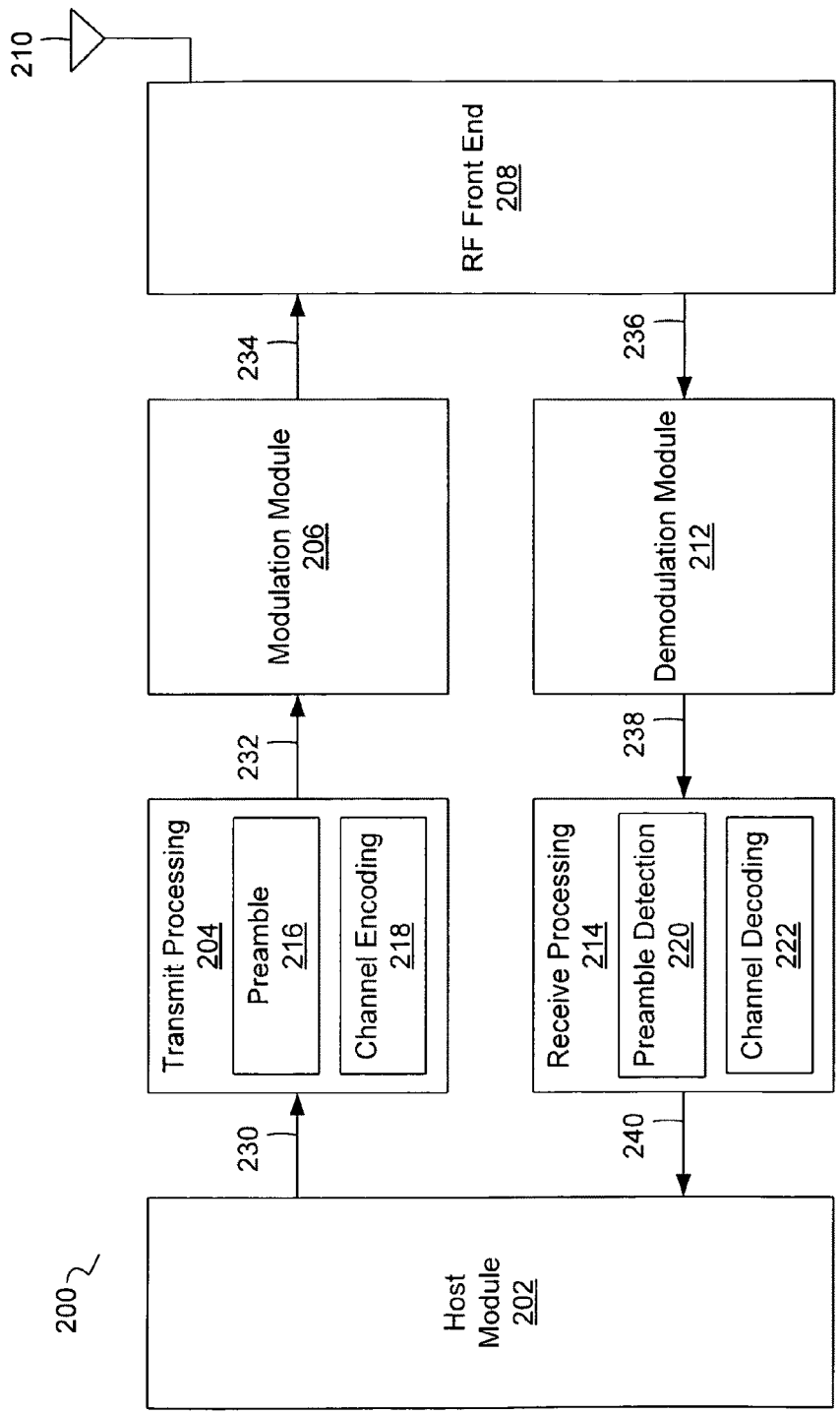
FIG. 2 illustrates a block diagram of an apparatus for processing preamble sequences in accordance with various embodiments.

FIG. 2 illustrates a block diagram an apparatus for processing preamble sequences for communication between the platforms or stations of FIG. 1 in accordance with various embodiments. In FIG. 2, a transmit processing module 204 provides an encoded signal 232 to modulation module 206. The encoded signal 232 may comprise the preamble sequence provided by preamble module 216. In addition, encoded signal 232 may comprise the processed and mapped information sequence generated by channel encoding module 218. These may be included, for example, within a transmission packet.

Modulation module 206 receives encoded signal 232 and performs modulation on the encoded signal 232. This may be performed one symbol at a time. In embodiments, the preamble sequence may be represented by an individual symbol. In addition, modulation module 206 may perform further operations, such as a digital to analog conversion of a modulated digital signal. FIG. 2 shows that these operations produce a modulated signal 234, which is sent to RF front end 208.

RF front end 208 exchanges signals between antenna 210, the modulation module 206 and a demodulation module 212. In particular, the RF front end 208 prepares modulated signal 234 for wireless transmission. In turn, the signal is transmitted wirelessly via antenna 210. In addition, the RF front end 208 prepares wireless signals received via antenna 210 for the demodulation module 212 and a receive process module 214. RF front end 208 may include various components (e.g., electronics) such as amplifiers, filters, upconverters, downconverters, diplexers, and/or circulators. Further, the antenna 210 may be a single antenna or a plurality of antennas. The embodiments, however, are not limited to these examples.

As shown in FIG. 2, the RF front end 208 may provide a received signal 236 to demodulation module 312. Upon receipt, demodulation module 212 may perform various operations. For example, the demodulation module 212 may perform an analog to digital conversion of the received signal 236 and then perform demodulation on the received signal 236. Such demodulation may involve the performance of Fast Fourier Transforms (FFTs). These operations produce a demodulated signal 238, which is sent to receive processing module 214.

As shown in FIG. 2, the receive processing module 214 may include a preamble detection module 220 and a channel decoding module 222. The channel decoding module 222 performs various operations on non-preamble portions of a demodulated signal 238. For instance, channel decoding module 222 may de-map such portions of the demodulated signal 238 into symbols. Also, the channel decoding module 222 may perform various operations on these symbols, such as de-interleaving, FEC decoding, and/or de-randomizing. The embodiments, however, are not limited to these operations. As a result of such operations, receive processing module 214 produces an information sequence 240, which is sent to a host module 202.

For purposes of illustration (and not limitation), FIG. 2 shows implementation 200 including a single antenna (210). The embodiments, however, are not so limited. Any number of antennas 210 may be employed. Through such antennas, wireless signals may be exchanged with remote devices.

Some implementations may include only preamble transmission features and other implementations may include only preamble detection features, as may be required for operation in certain networks. Thus, implementations that only transmit preambles may omit preamble detection module 220. In contrast, implementations that only receive preambles may omit the preamble module 216. However, implementations may include both preamble transmission features and preamble detection features.

Also, it is stated above that the elements of FIG. 2 may be implemented in hardware, software, firmware, or any combination thereof. Thus, implementations may include one or more processors that execute instructions or control logic stored in a tangible storage medium (e.g., memory). Moreover, the preamble module 216 may include a storage medium to store preamble sequences. However, embodiments are not limited to these exemplary usages of storage media.

In a select channel of the wireless communication network 100, a codeword may see multiple channel qualities ($q_1$, $q_2$, ..., $q_N$). In reference to channel quality, lengths of sequences for a SA-preamble ($N_{SAP}$) are 144 for a 512-fast Fourier transform (FFT), 288 for a 1024-FFT, and 576 for a 2048-FFT in an embodiment. Allocation of subcarriers may be accomplished according to Equation 1, when subcarrier indexes 256, 512, and 1024 are reserved for DC 306 of FIG. 3 for 512-FFT, 1024-FFT, and 2024-FFT respectively;

$$SAPreambleCarrierSet_n = n + 3 \cdot k + 40 \cdot \frac{N_{SAP}}{144} + \left[\frac{2 \cdot k}{N_{SAP}}\right] \quad \text{(Equation 1)}$$

where:
SAPreambleCarrierSet specifies all subcarriers allocated to the specific SA-preamble;
n is the index of the SA-preamble carrier-set 0, 1, and 2 representing segment ID;
k is a running index 0 to $N_{SAP}-1$ for each FFT size; and no circular shift is assumed.

Each segment uses an SA-preamble composed of a carrier set out of the three available carrier-sets in the following manner:
Segment 0 uses SA-preamble carrier-set 0.
Segment 1 uses SA-preamble carrier set 1.
Segment 2 uses SA-preamble carrier set 2.
Each cell identification (ID) has an integer value (IDCell) from 0 to 767. The IDCell is defined by segment index and an index per segment in Equation 2;

$$IDcell = 256 \cdot n + Idx \quad \text{(Equation 2)}$$

where:
n is the index of the SA-preamble carrier-set 0, 1, and 2 representing segment ID,
Idx=2 mod(q,128)+(q/128), where q is a running index 0 to 255.

SA-preamble sequences are partitioned and each partition is dedicated to a specific base station (BS) type such as a Macro BS, Femto BS, and etc. Partition information is broadcasted in extended system information.

For support of femtocell deployment, a femtocell BS may transmit its SA-preamble sequence over the segment or subcarrier set different from that used by an overlay macrocell BS if the femtocell BS is synchronized to macrocell BSs. Segment information of the overlay macrocell BS may be obtained by communications with macrocell BS through one or more backbone networks or active scanning of SA-preamble transmitted by the macrocell BS.

Figure 3:
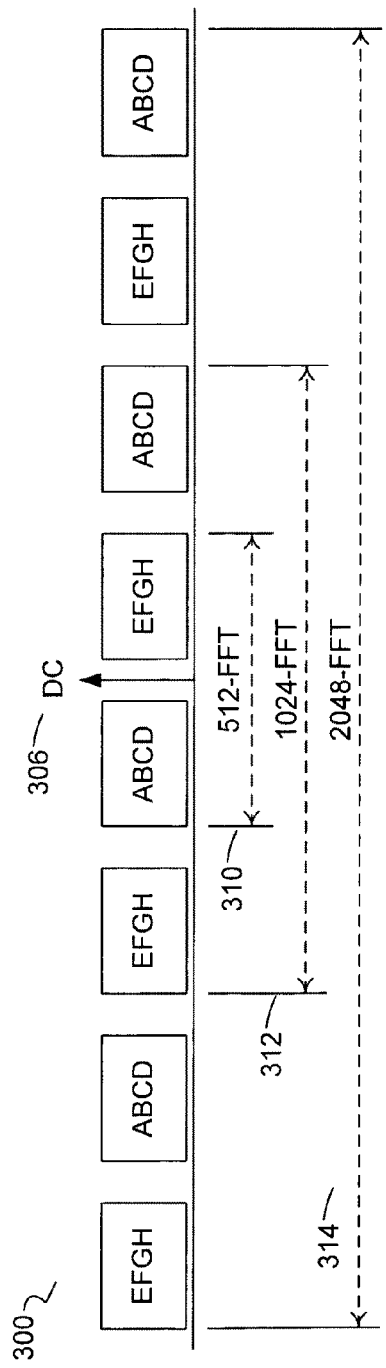
FIG. 3 is a block diagram for allocation of a sequence sub-blocks in accordance with various embodiments.

For 512-FFT size the SA preamble sequence, which may be a 144 bit sequence in BPSK or 288 bit sequence in QPSK, is divided into 8 main sub-blocks, namely A, B, C, D, E, F, G, and H. A length of each sub-block may be 18 bits using binary phase-shift keying (BPSK) or 36 bits in quadrature phase-shift keying (QPSK). Each segment ID has a different sequence of sub-blocks including 8 sub-blocks per segment ID where least significant bit (LSB) 18 bits are used to represent a binary sequence of each sub-block. The binary sequence {0,1} is mapped to real number {+1,−1}. For 512-FFT size as shown in element 310, A, B, C, D, E, F, G, and H are modulated using differential encoding and mapped sequentially in ascending order onto a circular-shifted SA-preamble subcarrier-set 300 corresponding to segment ID, as shown in FIG. 3. For higher FFT sizes, basic sub-blocks (A,B,C,D,E,F,G,H) are repeated in the same order. For instance, in 1024-FFT size as shown in element 312 of FIG. 3, E,F,G,H,A,B,C,D,E,F,G,H,A,B,C,D are modulated and mapped sequentially in ascending order onto the circular-shifted SA-preamble subcarrier-set corresponding to segment ID. An example of 2048-FFT size is shown in element 314.

A circular shift is applied to over three consecutive sub-carriers after applying sub-carrier mapping based on Equation 1. Each sub-block has a common offset. The circular shift pattern for each sub-block is:

[2,1,0 . . . , 2,1,0 . . . , 2,1,0,2,1,0,DC,1,0,2,1,0,2, . . . , 1, 0,2, . . . , 1,0,2] where the shift is circularly right shift. Applying a circular shift per sub-bock may avoid confusion with a legacy preamble, such as an 802.16e preamble wherein the 0.16e preamble has no circular shift. Circularly shifting the subcarrier set provides small cross correlation with a legacy preamble, for example an IEEE 802.16e preamble. Hence, avoiding the confusion of legacy preamble at a legacy STA.

Instead, the 0.16e preamble has a common offset over whole subcarriers given a segment number (0, 1, or 2). In an embodiment, a STA configured for 802.16e communications will detect the 0.16e preamble while a STA configured for 802.16m communications will detect a 0.16m preamble; including an embodiment of a STA configured for mixed mode communications capable of communicating using both 0.16e and 0.16m.

Figure 4:
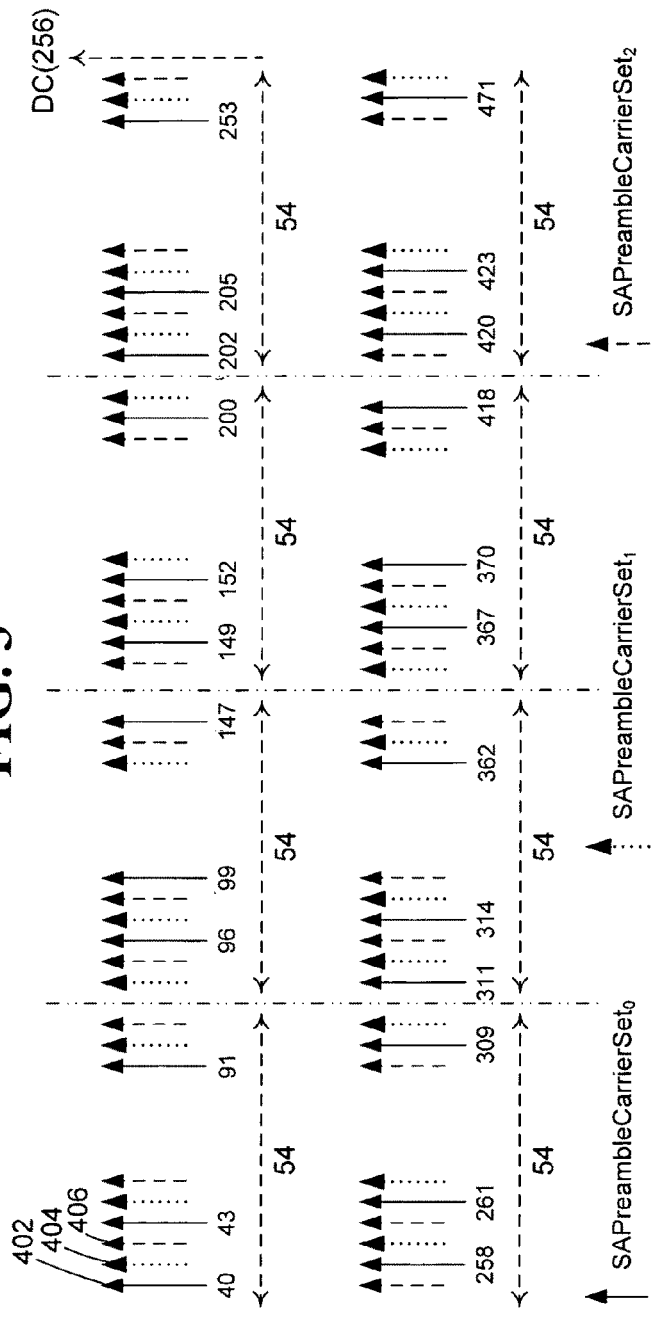
FIG. 4 illustrates a SA-Preamble symbol structure according to embodiments.

For 512-FFT size, the sub-blocks (A,B,C,D,E,F,G,H) experience the following right circular shift (0,2,1,0,1,0,2,1) respectively. FIG. 4 depicts a symbol structure of SA-preamble in the frequency domain for 512-FFT including SA-Preamble Carrier Set$_0$ 402, SA-Preamble Carrier Set$_1$ 404, and SA-Preamble Carrier Set$_2$ 406, indicating 54 carrier sets per group.

Figure 5:
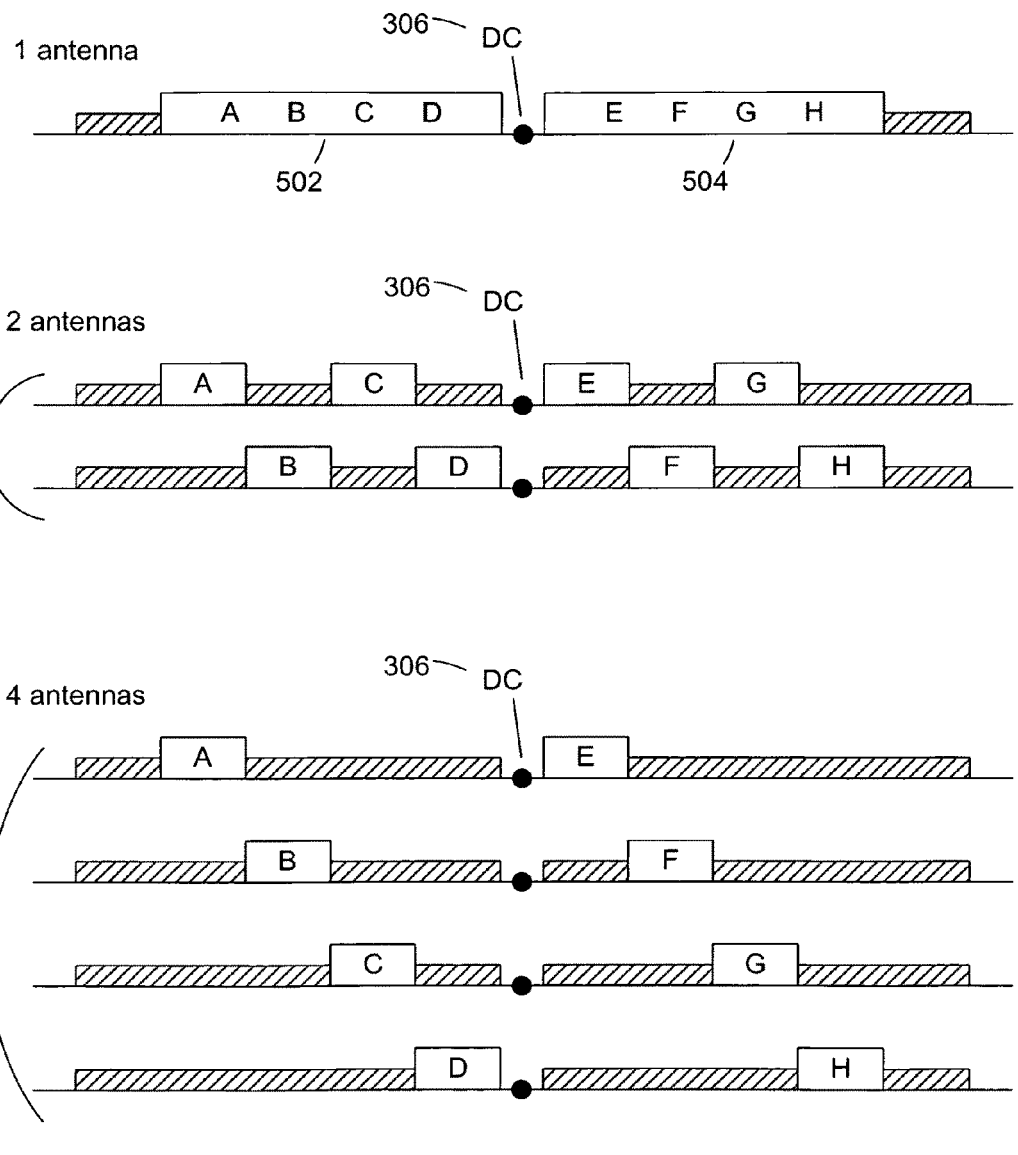
FIG. 5 is a block diagram of a multi-antenna example for interleaving of sub-blocks according to embodiments.

In an embodiment with a multiple antenna system such as a multiple input multiple output (MIMO) antenna system, the SA-preamble blocks or sub-blocks are interleaved on a number of antennas as follows. For 512-FFT size, FIG. 5 depicts an SA-preamble allocation for 1, 2, 4, and 8 antennas. As an example, for a one antenna device, all eight sub-blocks are transmitted by the antenna including sub-blocks A, B, C, and D in group 502 and sub-blocks E, F, G, and H in group 504. Four sub-blocks are sent per antenna in a two antenna system, two sub-blocks are sent per antenna in a four antenna system, and one sub-block is sent per antenna in an eight antenna system (not shown).

Figure 6:
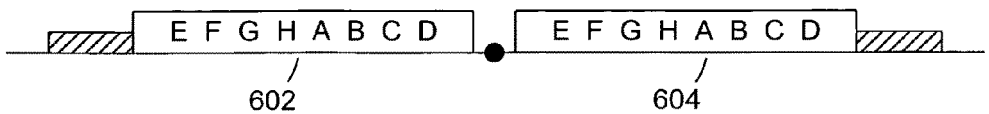
FIG. 6 is a block diagram that depicts SA-Preamble allocation in accordance with various embodiments.
Figure 6:
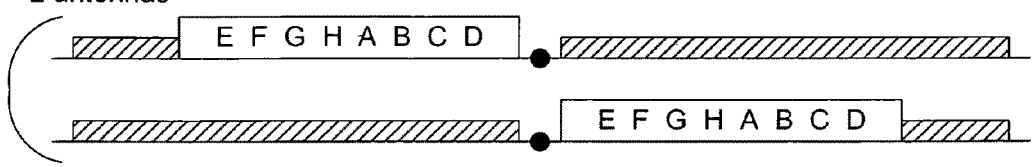
Figure 6:
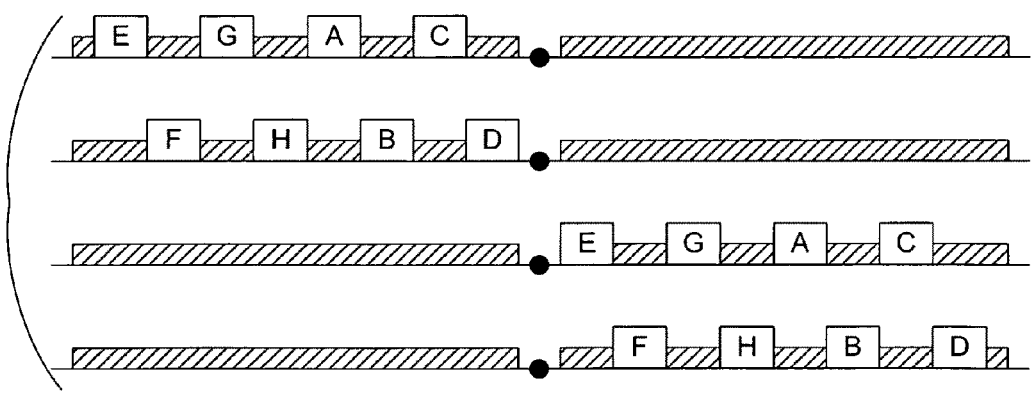
Figure 6:
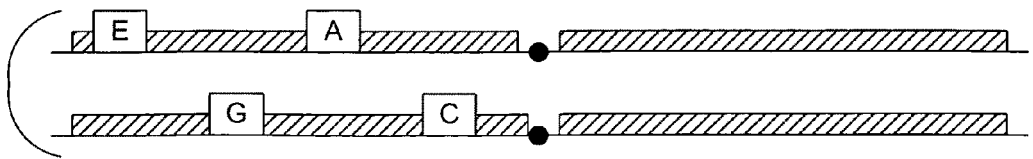

FIG. 6 illustrates an SA-preamble allocation for 1, 2, 4, and 8 antennas for 1024-FFT size. The SA-preamble blocks or sub-blocks are interleaved on the antennas as follows. For a one antenna device, 16 sub-blocks are transmitted by the one antenna including sub-blocks E, F, G, H, A, B, C, and D in group 602 and sub-blocks E, F, G, H, A, B, C, and D in group 604. Eight sub-blocks are sent per antenna in a two antenna system, four sub-blocks are sent per antenna in a four antenna system, and two sub-blocks are sent per antenna in an eight antenna system using the interleaved structure.

Figure 7:
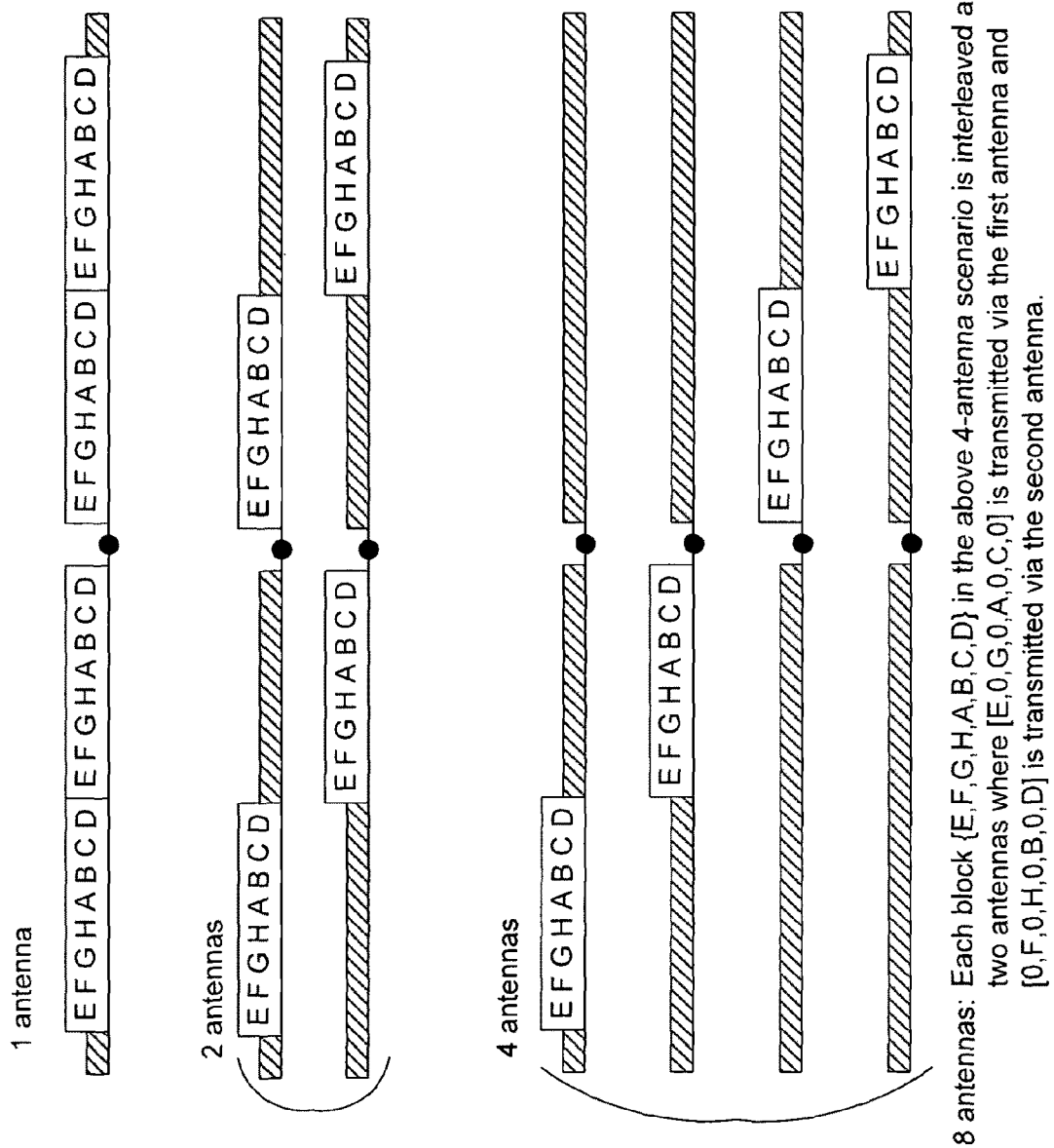
FIG. 7 is a block diagram of a multi-antenna example for interleaving of sub-blocks in accordance with embodiments.

FIG. 7 depicts an SA-preamble allocation for 1, 2, 4, and 8 antennas for 2048-FFT size. The SA-preamble blocks or sub-blocks are interleaved on the antennas similarly to the examples provided in FIG. 6 and FIG. 7. For a one antenna system, 32 sub-blocks are transmitted by the one antenna, 16 sub-blocks are transmitted per antenna in a two antenna system, and eight sub-blocks are transmitted per antenna in a four antenna system.

In an embodiment, let a block denote eight consecutive sub-blocks {E,F,G,H,A,B,C,D}. The algorithm to assign the preamble blocks or sub-blocks to multiple transmit antennas where the number of antennas is power of 2 can be described as follows. Let:

$N_t$: number of transmit antennas
$N_b$: total number of blocks
$N_s$: total number of sub-blocks; $N_s=8*N_b$
$N_{bt}$: number of blocks per antenna;

$$N_{bt} = \frac{N_b}{N_t}$$

$N_{st}$: number of sub-blocks per antenna;

$$N_{st} = \frac{N_s}{N_t}$$

If ($N_{bt} \geq 1$): distribute consecutive blocks across the N, antennas;
for a given antenna, a block is repeated with period $N_t$; and
block position of the (t+1)-th antenna=t+p*$N_t$, where t=0, 1, . . . , $N_t$−1, p=0,1, . . . , $N_{bt}$−1
Else, If ($N_{st}=4$):
Interleave the 8 sub-blocks {E,F,G,H,A,B,C,D} across each 2 consecutive antennas;
Block [E,0,G,0,A,0,C,0] is sent from antenna i at block position: floor (i/2);
Block [0,F,0,H,0,B,0,D] is sent from antenna i+1 at block position: floor ((i+1)/2), where i=0,2,4, . . . , $N_t$
Else, If ($N_{st}=2$):
Interleave the 8 sub-blocks {E,F,G,H,A,B,C,D} across each 4 consecutive antennas;
Block [E,0,0,0,A,0,0,0] is sent from antenna i at block position: floor (i/4);
Block [0,0,G,0,0,0,C,0] is sent from antenna i+1 at block position: floor ((i+1)/4);
Block [0,F,0,0,0,B,0,0] is sent from antenna i+2 at block position: floor ((i+2)/4);
Block [0,0,0,H,0,0,0,D] is sent from antenna i+3 at block position: floor ((i+3)/4), where i=0,4,8, . . . , $N_t$
Else:
Interleave the 8 sub-blocks {E,F,G,H,A,B,C,D} across each 8 consecutive antennas, i.e. send 1 sub-block per antenna;
Block [E,0,0,0,0,0,0,0] is sent from antenna i at block position: floor (i/8);
Block [0,F,0,0,0,0,0,0] is sent from antenna i+1 at block position: floor ((i+1)/8);
Block [0,0,G,0,0,0,0,0] is sent from antenna i+2 at block position: floor ((i+2)/8);

Block [0,0,0,H,0,0,0,0] is sent from antenna i+3 at block position: floor ((i+3)/8);
Block [0,0,0,0,A,0,0,0] is sent from antenna i+4 at block position: floor ((i+4)/8);
Block [0,0,0,0,0,B,0,0] is sent from antenna i+5 at block position: floor ((i+5)/8);
Block [0,0,0,0,0,0,C,0] is sent from antenna i+6 at block position: floor ((i+6)/8);
Block [0,0,0,0,0,0,0,D] is sent from antenna i+7 at block position: floor ((i+7)/8), where i=0,8, ..., $N_t$ At each time frame, the transmitted structures are rotated across the transmit antennas. Transmit structures are formed from the blocks based on the number of blocks and a number of transmit antennas. In embodiments, the transmit structures are rotated using phase rotation across the transmit antennas. The phase rotation may be chosen by random search.

For example, we consider the 512-FFT system with 4 transmit antennas. At the f-th frame, the preamble structure [A,0,0,0,E,0,0,0] is sent via the first antenna, and structure [0,0,0,D,0,0,0,H] is sent via the fourth antenna. Hence, at the (f+1)-th frame, structure [0,0,0,D,0,0,0,H] is sent via the first antenna, while structure [A,0,0,0,E,0,0,0] is sent via the second antenna.

The magnitude boosting levels for different FFT size and number of antennas using BPSK are as follows:

| | BPSK SA preamble boosting levels | | |
|---|---|---|---|
| | FFT | | |
| Ant | 512 | 1k | 2k |
| 1 | 1.5928 | 1.9516 | 1.4748 |
| 2 | 2.1841 | 2.5474 | 2.0800 |
| 4 | 2.8489 | 3.1047 | 3.0915 |
| 8 | 3.5523 | 4.0273 | 4.3691 |

Alternate modulation technique(s) may be applied such as QPSK or 8-phase-shift keying (8PSK) resulting in SA Preamble boosting levels specific to the modulation technique used.

For a single antenna BPSK embodiment, the SA-preamble is transmitted with a magnitude boost of 1.5928. The boosted SA-preamble at k-th subcarrier can be written as:

$$c_k = 1.5928 \cdot b_k$$

where $b_k$ represents SA-preamble before the boosting (+1 or −1).

In an embodiment, a block cover sequence {+1,−1} for each sub-block in the structure is optimized for an arbitrary number of transmit antennas and any bandwidth. The binary sequence {0,1} is mapped to real number {+1,−1}. The block cover sequence of each case for BPSK is:

| | BPSK SA Preamble block cover sequence | | |
|---|---|---|---|
| (FFT, number | | Segment ID | |
| of antennas) | 0 | 1 | 2 |
| (512, 1) | DE | DE | 0A |
| (512, 2) | 04 | C0 | 28 |
| (512, 4) | 20 | 00 | 90 |
| (512, 8) | 00 | 00 | 00 |
| (1024, 1) | 7CD6 | 7B2E | C66C |
| (1024, 2) | 1A1A | E2E2 | 0A0A |

-continued

| | BPSK SA Preamble block cover sequence | | |
|---|---|---|---|
| (FFT, number | | Segment ID | |
| of antennas) | 0 | 1 | 2 |
| (1024, 4) | 1010 | 9090 | 2828 |
| (1024, 8) | 2020 | A0A0 | 8080 |
| (2048, 1) | 68E7E631 | FC8474DB | 69C337F3 |
| (2048, 2) | 2C210259 | C2042058 | 7D160BC4 |
| (2048, 4) | 6A5D2AF2 | 6476EDE6 | 56C6A39B |
| (2048, 8) | E659356A | 958047EE | 1AD81B52 |

Alternate modulation technique(s) may be applied such as QPSK or 8-phase-shift keying (8PSK) resulting in SA Preamble block cover sequence values specific to the modulation technique used. The block cover sequence may reduce a peak-to-average power ratio (PAPR) without affecting detection performance. Further, a STA such as the single radio advanced mobile station 140 or the multi-radio advanced mobile station 135 does not need to know values of the block sequence since differential encoding and detection is done per sub-block.

Embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 8:
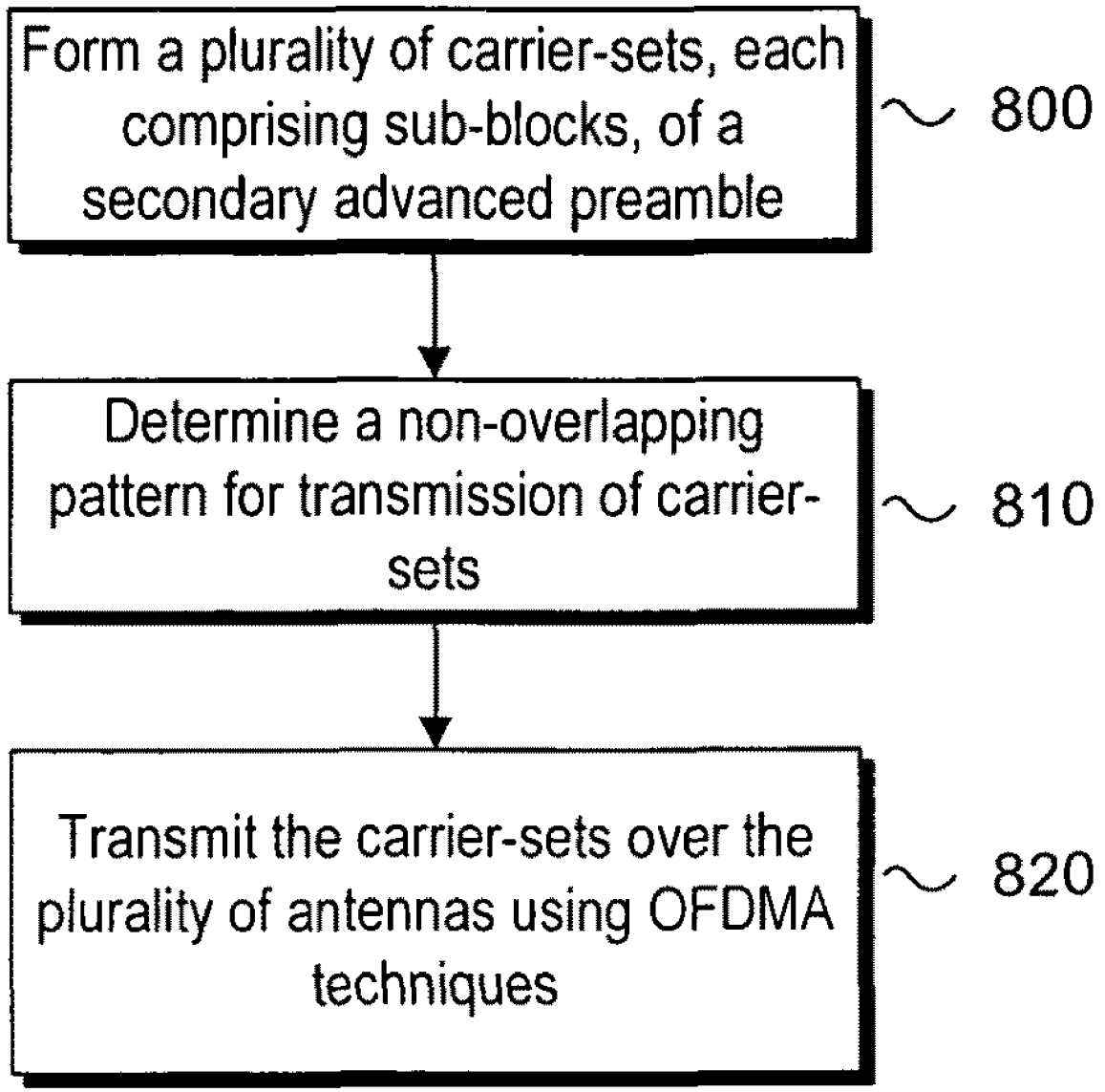
FIG. 8 is a flow diagram in accordance with some embodiments of the invention.

FIG. 8 is a flow diagram in accordance with some embodiments of the invention. In element 800, a plurality of carrier-sets is formed from a secondary advanced (SA) preamble, wherein each carrier-set comprises sub-blocks. A non-overlapping pattern for transmission of carrier sets is determined in element 810 and the carrier-sets are transmitted over a plurality of antennas using OFDMA techniques in element 820. In an embodiment, three SA preamble carrier-sets are formed, although fewer or additional carrier-sets may be formed in alternate embodiments. Further, the non-overlapping pattern for transmission of the carrier-sets may provide a minimized peak-to-average power ratio (PAPR).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

Embodiments of this invention may be used as or to support a software program executed upon some form of processing core (such as a processor of a computer) or otherwise implemented or realized upon or within a machine-readable medium. The present invention may be provided as a computer program product or software which may include a tangible machine readable medium having stored thereon instructions which may be used to program a computer (or other electronic devices) to perform a process according to the present invention. Such software can be stored within a memory in the system. Similarly, the code can be distributed via a network or by way of other computer readable media.

Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Accordingly, the computer-readable medium includes any type of media/machine-readable medium suitable for storing or transmitting electronic instructions or information in a form readable by a machine (e.g., a computer). Moreover, the present invention may also be downloaded as a computer program product. As such, the program may be transferred from a remote computer (e.g., a server) to a requesting computer (e.g., a client). The transfer of the program may be by way of electrical, optical, acoustical, or other forms of data signals embodied in a carrier wave or other propagation medium via a communication link (e.g., a modem, network connection or the like).

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that may be in motion while it is communicating.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
    processing a superframe containing multiple sequential frames for communication in a wireless communications network using orthogonal frequency division multiplexing (OFDM) techniques, wherein a frame of the multiple sequential frames comprises a secondary advanced preamble (SA preamble) sequence comprised of at least three segments, each segment comprising sub-carriers;
    a hardware preamble module interspersing the sub-carriers of each segment from the at least three segments for sub-carrier mapping to sub-carriers pertaining to a single OFDM symbol, wherein a segment-specific SA preamble carrier set in the single OFDM symbol=$n+3*k+(40*(NSAP/144))*(2*k/NSAP)$, where NSAP is a number of sub-carriers in the SA preamble, n is an index for the at least three segments with an ascending index value for each consecutive segment in the at least three segments, and k is a running index from 0 to (NSAP−1);
    dividing the SA Preamble into multiple sub-blocks; and
    applying a circular-shift SA preamble that is circularly shifted per sub-block in the multiple sub-blocks in relation to the sub-carriers in the single OFDM symbol.

2. The method claim 1, further including interleaving the multiple sub-blocks over a plurality of antennas.

3. The method of claim 1, wherein the superframe is processed in an advanced base station (ABS).

4. The method of claim 1, further including applying differential encoding to the sub-blocks.

5. The method of claim 4, wherein the circularly-shifted SA preamble corresponds to a segment ID.

* * * * *